United States Patent [19]

Feinberg

[11] Patent Number: 4,763,517
[45] Date of Patent: Aug. 16, 1988

[54] VALVE CAP PRESSURE INDICATOR

[76] Inventor: Andrew S. Feinberg, P.O. Box 9858, El Paso, Tex. 79989

[21] Appl. No.: 62,657

[22] Filed: Jun. 16, 1987

[51] Int. Cl.$^4$ ............................................. G01C 23/02
[52] U.S. Cl. ................................................. 73/146.8
[58] Field of Search ......................... 73/146.8; 340/58

[56] References Cited

U.S. PATENT DOCUMENTS

| | | | |
|---|---|---|---|
| 3,592,218 | 7/1971 | Guy | 73/146.8 |
| 4,037,192 | 7/1977 | Cowit | 340/58 |
| 4,119,944 | 10/1978 | Smith | 73/146.8 |
| 4,137,520 | 1/1979 | Deveau | 73/146.8 |
| 4,494,106 | 1/1985 | Smith et al. | 340/58 |
| 4,529,961 | 7/1985 | Nishimura et al. | 340/58 |
| 4,581,925 | 4/1986 | Crutcher | 73/146.8 |

Primary Examiner—Donald O. Woodiel
Attorney, Agent, or Firm—Pollock, VandeSande & Priddy

[57] ABSTRACT

A system for measuring and indicating air tire pressure which is adapted for mounting on the valve stem of a tire. The system, which is entirely self-contained in a housing threaded for fastening to the valve stem, includes a pressure transducer, a signal processing unit connected to the pressure transducer, display means connected to the signal processing unit to display pressure, and a battery to provide electric energy. A plunger is axially mounted within the housing, which when depressed, closes an electric circuit between the battery and the electronic components, and also activates the valve to admit air into the housing from the tire.

6 Claims, 2 Drawing Sheets

VALVE CAP PRESSURE INDICATOR

This invention relates to systems for measuring and indicating air tire pressure and more particularly to systems for measuring and indicating air tire pressure which are mountable on the valve stem of a tire.

BACKGROUND OF THE INVENTION

The operating lifetime of a vehicle tire depends to a great extent on maintaining a proper pressure of air within the tire. For example, underinflation causes an increase in the flexing in the tread area, producing heat through friction and a resulting higher temperature of the tire which increases the rate of tire deterioration. In addition to the economic aspects of decreased tire lifetime, there are the safety aspects of operating a vehicle with underinflated tires. Overinflation, while it may result in a lower operating temperature, causes non-uniform tire wear and thus decreases the useful lifetime of a tire.

Although the advantages of maintaining tires properly inflated are well-known, there is a tendency on the part of many individuals to neglect tire maintenance. At least part of this attitude may result from the fact that modern tires require little attention and can remain at or near a proper inflation pressure for extended periods of time. A system for indicating tire pressure which is incorporated into the tire itself would make it more convenient for vehicle operators to monitor tire pressures, and such systems have been proposed in the prior art. However, some of these systems require substantial modifications to the tire, to the wheel or even to the vehicle itself. Others, such as those having an entire system which is mounted on the valve stem, can be difficult to read with accuracy.

U.S. Pat. No. 3,592,218 to Guy et al discloses a valve stem-mounted device which is described as combining the functions of a tire gauge and tire inflator. The tire gauge includes a slidable spring-biased piston which is responsive to air pressure when the gauge is activated. This device has no electrical components, and has limitations inherent in purely mechanical instruments. For example, instrumentation based only on mechanical properties are less flexible in the features which can be incorporated in the gauge.

U.S. Pat. No. 4,119,944 to Smith discloses a system for measuring air pressure in the tire of a moving vehicle and indicating that pressure to the vehicle driver. The system includes a wheel-mounted transducer, a chassis-mounted sensor and a chassis mounted electronic processing unit for converting sensor signals to tire pressure indications.

U.S. Pat. No. 4,137,520 to Deveau discloses a system for indicating tire pressure in which a tire pressure indicator is secured and disposed in the interior of the tire and mounted on the portion of the tire valve stem which is within the tire. The tire pressure indicator includes a pressure-tight bellows container which is preloaded to a selected gas pressure and which contains a strain gauge, a telemetering signal transmitter and a battery power source.

U.S. Pat. No. 4,494,106 to Smith et al discloses a system for continuously measuring tire pressure and which includes signal generating means mounted on the inside of the rim of a vehicle wheel.

U.S. Pat. No. 4,529,961 to Nishimura discloses a wheel-mounted tire pressure sensor which is mounted in the hub cap of a vehicle wheel. Pressure in the tire activates a sensor which is mounted within the hub cap of the tire to be monitored. The apparatus includes means for generating and broadcasting an electromagnetic signal which is representative of tire pressure, and means for receiving the signal by the vehicle operator.

U.S. Pat. No. 4,581,925 to Crutcher discloses a tire pressure indicating system using valve stem-mounted transducers connected to a hub-mounted display device.

An improved system for measuring and indicating tire pressure which can readily be added to a conventional tire without modifying the tire, the wheel or the vehicle and which provides a readily legible display of the pressure within the tire is desirable.

SUMMARY OF THE INVENTION

It is accordingly one object of this invention to provide a device for mounting on a the valve stem of a tire that measures and indicates the pressure of air within the tire.

It is another object of this invention to provide a device for measuring and indicating tire pressure which provides a highly legible indication of the tire pressure.

It is still another object of this invention to provide a gauge for measuring and indicating pressure in which the measuring and indicating are effectuated electrically upon manual activation of the gauge.

In accordance with the invention, there has been provided a valve stem-mounted system for measuring and indicating the pressure of air within a tire. All components of the system are mounted within a housing which is threaded for attachment to the valve stem of a tire and functions as a valve stem cap. The housing contains: a pressure transducer; means for bringing the pressure transducer in fluid communication with the interior of the tire; a signal-processing unit which is operationally connected to the pressure transducer for converting signals received from the transducer; a display unit operationally connected to the signal-processing unit for displaying tire air pressure; an electric battery connected through switch means to furnish power to the signal-processing unit and the display unit, and means for manually operating said switch from the exterior of said housing to power the signal-processing unit and the display unit.

The resulting pressure measuring and indicating device is self-contained, i.e., it functions independently of any elements outside the housing, and it requires no modifications to the tire. The display unit provides a highly visible indication of tire pressure, and the power source, the battery, is in use only when a reading is made of the tire pressure, thus prolonging the life of the battery.

DETAILED DESCRIPTION OF THE INVENTION

Figure 1:
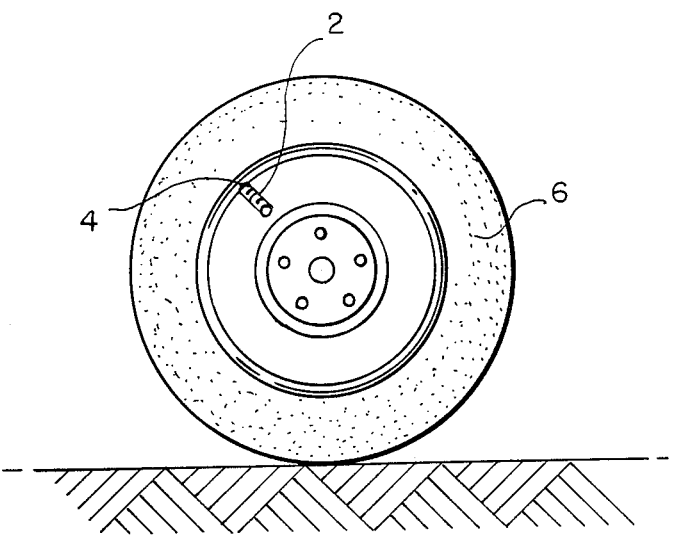
FIG. 1 is a view in elevation of a tire which is mounted on a wheel and which has the valve cap of this invention secured to the valve stem.
Figure 2:
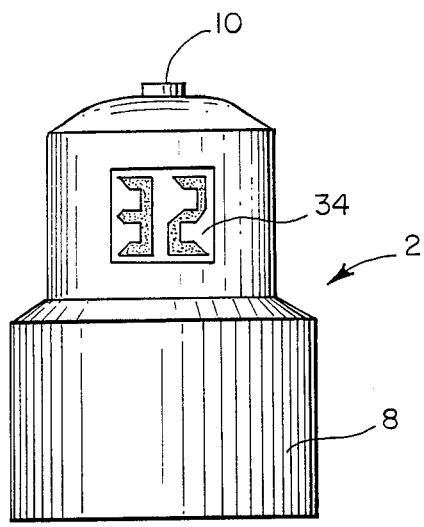
FIG. 2 is an enlargement of a view in elevation of the valve cap of this invention illustrating a display of tire pressure.

FIG. 1 shows the valve cap system 2 of this invention mounted on valve stem 4 of vehicle tire 6. As shown in an enlarged view in FIG. 2, when the system is actuated, a display 34 on the upper portion of valve cap housing 8 indicates the pressure of the air within the tire.

Figure 3:
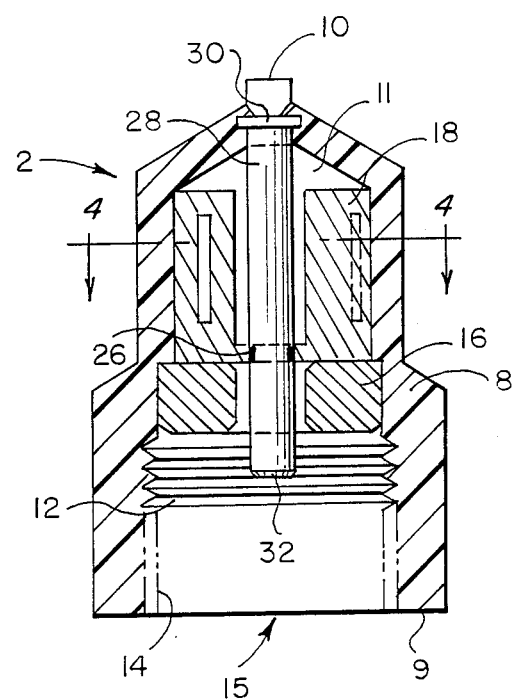
FIG. 3 is a view in cross-section of the valve cap of this invention.

FIG. 3 is a view in cross-section of the valve system 2 of this invention. As shown in FIG. 3, valve cap housing 8, which preferably is made of a clear, flexible plastic, defines cavity 15 which comprises lower cavity zone 12 and upper cavity zone 11. Lower cavity zone 12 provides space for battery 16 and is provided with threads 14 on the internal wall surface near inner end 9 at valve cap housing 8 for securing the valve cap system to the valve stem of a tire. Upper zone 11 provides space for electronic module 18. Elongated plunger 28 is mounted within valve cap housing 8 at the housing centerline and is adapted for axial movement by pressing outer end 10 of housing 8. Outer end 30 of plunger 28 is flanged and embedded in the material forming the housing.

Plunger 28 is dimensioned so that inner end 32 will press against the end of the valve core (not shown) and release air when pressure is applied to the outer end 10 of the housing.

Depressing the plunger 28 not only releases air from tire 6 into housing cavity 12 but its axial movement brings switch 26 into position to close an electric circuit between the battery 16 and electronic module 18. When pressure is released from the outer end 10 of housing 8, the housing resumes the shape shown in FIG. 3 because of the elasticity of the plastic forming the housing 8.

The plunger 28 may be made of electrical insulating material such as, for example, plastic or a ceramic, which would prevent the plunger itself from closing the circuit between the battery 16 and the electronic module 18 when it is in the raised position. However, the plunger may be made of electrically conductive material such as aluminum or steel if it is dimensioned to avoid closing the circuit by merely having the circumferential surface of the plunger per se touch the battery contacts and thus close the circuit.

Figure 5:
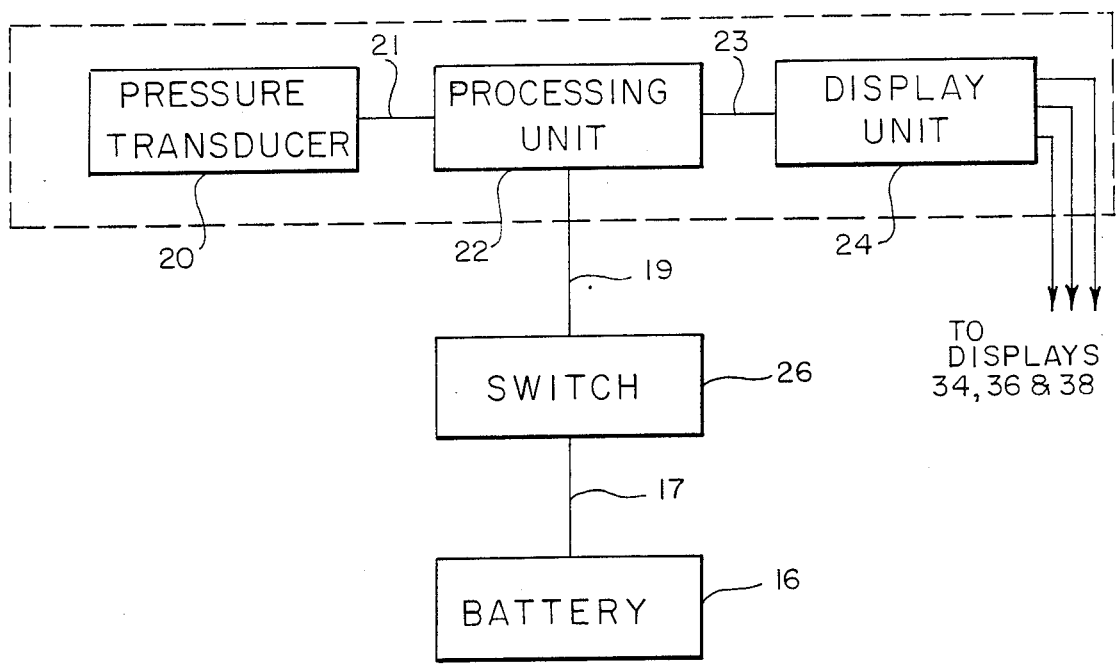
FIG. 5 is a block diagram of the electronic module of the valve stem-mounted pressure measuring and displaying system.

As shown in FIG. 5, power is supplied to electronic module 18 from battery 16 through switch 26 by electrical circuits 17, 19. Electronic module 18 contains pressure transducer 20, processing unit 22 and display unit 24 which are interconnected electrically by circuits 21, 23.

Pressure transducer 20 may be an air strain gauge or other means for sensing air pressure which will fit within the space available in the valve cap. A strain gauge may of the type such as is described in U.S. Pat. No. 4,581,925 to Crutcher, which are produced or made available in the marketplace by companies such as, for example, Celesco Transducer Products, Inc., Entran Devices, Inc., The Foxboro Corp., Kavlico Corp., Motorola, Inc., and others.

In operation, pressure transducer 20 sends a signal representing pressure to processing unit 22 which converts a sensed analog signal to a digital signal representing the pressure in tire 6. Processing unit 22 is operationally connected through display unit 24 to drive display chips 34, 36 and 38. The signal converting processing unit 22 and display driver unit 24 are known in the art as indicated in U.S. Pat. No. 4,581,925.

Figure 4:
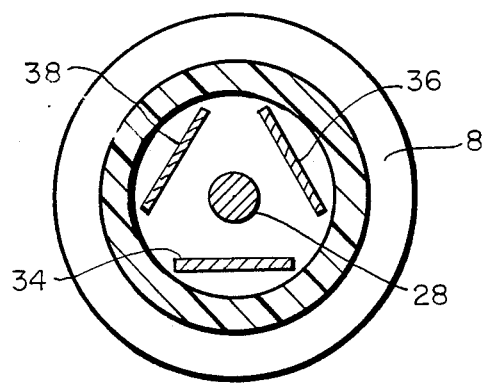
FIG. 4 is a plan view of the structure shown in FIG. 3 showing a typical orientation of separate display units within the valve cap.

As shown in FIG. 4, display chips 34, 36 and 38 may be of the liquid crystal display type, mounted at about 120° from each other. This arrangement permits the pressure to be read easily regardless of the angular orientation of individual chips and is preferred, although the use of two chips, or even only one, is contemplated.

This invention is not limited to the details set forth herein, and modifications can readily be made by those skilled in the art in light of these teachings.

What is claimed is:

1. A valve stem-mounted system for measuring and displaying the pressure of air within a pneumatic tire comprising:
   (a) a housing, a portion of which is threaded for mounting onto a tire valve stem;
   (b) a pressure transducer mounted within said housing;
   (c) a signal processing unit mounted within said housing, said processing unit being operationally connected to said transducer for converting signals received from said transducer;
   (d) display means mounted within said housing and electrically connected to said signal processing unit for displaying tire air pressure;
   (e) an electric battery power source mounted within said housing and connected through switch means to furnish power to operate said signal processing unit and said display means;
   (f) means for manually operating said switch to power said processing unit and said display means; and
   (g) means for bringing said pressure transducer into fluid communication with the interior of said tire;
   wherein said display means comprises a plurality of display chips.

2. A valve stem-mounted system for measuring and displaying the pressure of air within a pneumatic tire comprising:
   (a) a housing, a portion of which is threaded for mounting onto a tire valve stem;
   (b) a pressure transducer mounted within said housing;
   (c) a signal processing unit mounted within said housing, said processing unit being operationally connected to said transducer for converting signals received from said transducer;
   (d) display means mounted within said housing and electrically connected to said signal processing unit for displaying tire air pressure;
   (e) an electric battery power source mounted within said housing and connected through switch means to furnish power to operate said signal processing unit and said display means;
   (f) means for manually operating said switch to power said processing unit and said display means; and
   (g) means for bringing said pressure transducer into fluid communication with the interior of said tire;
   wherein said display means comprises three display chips mounted about the periphery of the housing at an angle of about 120° from each other.

3. A valve stem-mounted system for measuring and displaying the pressure of air within a pneumatic tire comprising:

(a) a housing, a portion of which is threaded for mounting onto a tire valve stem;
(b) a pressure transducer mounted within said housing;
(c) a signal processing unit mounted within said housing, said processing unit being operationally connected to said transducer for converting signals received from said transducer;
(d) display means mounted within said housing and electrically connected to said signal processing unit for displaying tire air pressure;
(e) an electric battery power source mounted within said housing and connected through switch means to furnish power to operate said signal processing unit and said display means;
(f) means for manually operating said switch to power said processing unit and said display means; and
(g) means for bringing said pressure transducer into fluid communication with the interior of said tire; wherein said transducer is a strain gauge.

4. A valve stem-mounted system for measuring and displaying the pressure of air within a pneumatic tire comprising:
(a) a housing, a portion of which is threaded for mounting onto a tire valve stem;
(b) a pressure transducer mounted within said housing;
(c) a signal processing unit mounted within said housing, said processing unit being operationally connected to said transducer for converting signals received from said transducer;
(d) display means mounted within said housing and electrically connected to said signal processing unit for displaying tire air pressure;
(e) an electric battery power source mounted within said housing and connected through switch means to furnish power to operate said signal processing unit and said display means;
(f) means for manually operating said switch to power said processing unit and said display means; and
(g) means for bringing said pressure transducer into fluid communication with the interior of said tire;
wherein said means for manually operating said switch comprises an elongated plunger which is axially mounted within said housing and is adapted to open or close an electric circuit between said battery and said signal processing unit and said display means by axial displacement of said plunger.

5. The valve stem-mounted system of claim 4 wherein said plunger has an inner and an outer end, and said inner end is adapted to cooperate with the valve core of said valve stem to release air from the tire into the cavity formed by said housing.

6. The valve stem-mounted system of claim 5 wherein the outer end of said plunger is embedded in the outer end of said housing and is adapted for axial movement by pressing on the outer end of said housing.

* * * * *

UNITED STATES PATENT AND TRADEMARK OFFICE
CERTIFICATE OF CORRECTION

PATENT NO. : 4,763,517
DATED : August 16, 1988
INVENTOR(S) : Andrew S. Feinberg

It is certified that error appears in the above-identified patent and that said Letters Patent is hereby corrected as shown below:

Column 2, line 19, "on a the" should read -- on the --.

Column 2, line 26, after "indicating" insert -- tire --.

Signed and Sealed this

Third Day of January, 1989

Attest:

DONALD J. QUIGG

*Attesting Officer*     *Commissioner of Patents and Trademarks*